US009560538B2

United States Patent
Su et al.

(10) Patent No.: US 9,560,538 B2
(45) Date of Patent: *Jan. 31, 2017

(54) DETERMINING CONNECTION STATES OF A MOBILE WIRELESS DEVICE

(71) Applicant: Apple Inc., Cupertino, CA (US)

(72) Inventors: Li Su, San Jose, CA (US); Srinivasan Nimmala, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,623

(22) Filed: Jun. 6, 2016

(65) Prior Publication Data

US 2016/0323765 A1  Nov. 3, 2016

Related U.S. Application Data

(63) Continuation of application No. 13/931,651, filed on Jun. 28, 2013, now Pat. No. 9,363,694.

(60) Provisional application No. 61/666,701, filed on Jun. 29, 2012.

(51) Int. Cl.
| | | |
|---|---|---|
| *H04W 24/00* | (2009.01) | |
| *H04W 24/08* | (2009.01) | |
| *H04W 72/12* | (2009.01) | |
| *H04W 74/08* | (2009.01) | |
| *H04W 76/02* | (2009.01) | |
| *H04W 76/04* | (2009.01) | |

(52) U.S. Cl.
CPC ......... *H04W 24/08* (2013.01); *H04W 72/1284* (2013.01); *H04W 74/0833* (2013.01); *H04W 76/028* (2013.01); *H04W 76/046* (2013.01)

(58) Field of Classification Search
None
See application file for complete search history.

(56) References Cited

U.S. PATENT DOCUMENTS

| | | | |
|---|---|---|---|
| 8,406,179 | B2 | 3/2013 | Kim et al. |
| 8,867,430 | B2 | 10/2014 | Chung |
| 2010/0234026 | A1 | 9/2010 | Tenny |
| 2013/0003700 | A1 | 1/2013 | Zhang et al. |
| 2013/0022015 | A1 | 1/2013 | Jung et al. |
| 2013/0083713 | A1 | 4/2013 | Johansson et al. |

FOREIGN PATENT DOCUMENTS

WO  2011063290 A1  5/2011

*Primary Examiner* — Vladimir Magloire
*Assistant Examiner* — Shantell L Heiber
(74) *Attorney, Agent, or Firm* — Downey Brand LLP

(57) ABSTRACT

Methods, apparatuses and computer readable media are described that determine a connection state between a mobile wireless device and a wireless network upon detection of an interruption of a connection between the mobile wireless device and the wireless network. The mobile wireless device transmits an uplink resource allocation message to the wireless network, and when receiving no response to the uplink resource allocation message, transmits a random access message to the wireless network. When receiving no response from the wireless network to the random access message, the mobile wireless device executes a radio link failure procedure. In an embodiment, the uplink resource allocation message includes a unique identifier for an existing radio resource control connection between the mobile wireless device and the wireless network.

20 Claims, 12 Drawing Sheets

DETERMINING CONNECTION STATES OF A MOBILE WIRELESS DEVICE

CROSS-REFERENCE TO RELATED APPLICATIONS

This application is a continuation of U.S. application Ser. No. 13/931,651, filed Jun. 28, 2013, which claims the benefit of U.S. Provisional Application No. 61/666,701, filed Jun. 29, 2012, both of which are incorporated by reference herein in their entireties for all purposes.

TECHNICAL FIELD

The described embodiments generally relate to methods and apparatuses for managing connections states between mobile wireless devices and wireless networks. More particularly, the present embodiments describe determining connection states between a mobile wireless device and a wireless network after a radio frequency tune-away period.

BACKGROUND

Wireless networks continue to evolve as new communication technologies develop and standardize. Wireless network operators can deploy new communication technologies in parallel with earlier generation communication technologies, and wireless networks can support multiple communication technologies simultaneously to provide smooth transitions through multiple generations of mobile wireless devices. Mobile wireless devices can include hardware and software to support wireless connections to different types of wireless networks that use different wireless communication technologies. Wireless networks using different radio access technologies (RATs) can overlap in geographic area coverage, and mobile wireless devices can support connections using different RATs depending on services and/or coverage available. A wireless service provider can provide services to mobile wireless devices through overlapping wireless networks, and mobile wireless devices can connect to one or more of the overlapping wireless networks. In a representative embodiment, a wireless service provider and/or a mobile wireless device can include simultaneous support for a Third Generation Partnership Project (3GPP) Long Term Evolution (LTE) wireless communication protocol and a "legacy" third generation (and/or earlier generation) wireless communication protocol. Representative "legacy" protocols include the Third Generation Partnership Project 2 (3GPP2) Code Division Multiple Access (CDMA) 2000 1× (also referred to as 1×RTT or 1×) wireless communication protocol, the 3GPP Universal Mobile Telecommunications System (UMTS) wireless communication protocol, and the 3GPP Global System for Mobile Communications (GSM) wireless communication protocol.

A dual network mobile wireless device that includes support for both CDMA 2000 1× and LTE is described as a representative device herein. The same teachings, however, can be applied to other mobile wireless devices that can operate in dual (or more generally multiple) wireless networks that use different radio access technologies. In particular, the teachings disclosed herein can pertain to mobile wireless devices that switch wireless circuitry contained therein from one wireless radio access technology to another wireless radio access technology and back again. The teachings provided herein apply to mobile wireless devices that interrupt transmission and/or reception between the mobile wireless device and a first wireless access network for an extended period of time, e.g., to transmit and/or receive on a second wireless access network, and upon return to the first wireless access network determine a connection state for a radio resource control (RRC) connection between the mobile wireless communication device and the first wireless access network.

Dual radio mobile wireless devices can include separate sets of wireless circuitry for each wireless communication protocol, such as a first wireless circuitry to support connections with a CDMA 2000 1× wireless network and a second wireless circuitry to support connections with an LTE wireless network. In particular, in a dual radio mobile wireless device, each wireless circuitry can include its own receive signal processing chain, including in some instances multiple receive antennas and attendant signal processing blocks for each wireless circuitry for a given radio access technology. With separate radio frequency receive signaling chains available to each wireless circuitry in the dual radio mobile wireless device, paging messages can be received independently from two different wireless networks, such as from the CDMA 2000 1× wireless network and from the LTE wireless network, by the dual radio mobile wireless device. Even when the dual radio mobile wireless device is connected and actively transferring data using one wireless circuitry to one of the wireless networks, such as the LTE wireless network, the dual radio mobile wireless device can also listen for and receive a paging message through the other parallel wireless circuitry from a second wireless access network, such as the CDMA 2000 1× wireless network. Thus, the dual radio mobile wireless device can establish a mobile device originating or mobile device terminating circuit switched voice connection through the CDMA 2000 1× wireless network while also being actively connected to (or simultaneously camped on) a packet switched LTE wireless network. Dual radio mobile wireless devices, however, can consume more power, can require a larger physical form factor and can require additional components (and cost more) than a more integrated "single radio" mobile wireless device.

A single radio mobile wireless device, at least in some configurations, can include wireless circuitry that can support different wireless communications protocols but can be unable to be actively connected to a first wireless access network and to receive communication from a second wireless access network simultaneously. The single radio mobile wireless device can support multiple wireless communication technologies, such as connections to a CDMA 2000 1× wireless network and to an LTE wireless network, but only to one wireless network at any given time. The single radio mobile wireless device can be limited to receiving signals that use one wireless communication technology type at a time, particularly when multiple antennas are used to receive signals for a single communication technology that supports receive diversity. In some embodiments, the single radio mobile wireless device can include a single radio frequency receive signaling chain that can process one radio frequency technology at a time. In a representative embodiment, a single radio mobile wireless device is able to connect to or camp on an evolved Universal Mobile Telecommunications System (UMTS) Terrestrial Radio Access Network (eUTRAN) of an LTE (or LTE-Advanced) wireless network and also to connect to or camp on a radio access network (RAN) of the CDMA 2000 1× wireless network, but not to both wireless networks simultaneously. The single radio mobile wireless device can be registered on both the LTE wireless network and on the CDMA 2000 1× wireless network and can therefore form connections with each wireless network singly but not simultaneously. The single radio mobile wireless device can be connected on the LTE wireless network and can interrupt the connection to the LTE wireless network to maintain registration on the CDMA 2000 1× wireless network. During the interrupted connection, control signaling and responses to received transmissions between the mobile wireless device and the wireless access network portion of the LTE wireless network can be interrupted. Packet transmissions and/or signaling messages from the LTE wireless network to the single radio mobile wireless device can be dropped. For sufficiently long interruptions, the LTE wireless network can drop a radio resource control (RRC) connection with the single radio mobile wireless device. Upon returning to the LTE wireless network from the CDMA 2000 1× wireless network, the mobile wireless device can assume the RRC connection with the LTE wireless network is still active, while the LTE wireless network can assume an "idle" connection state exists with the mobile wireless device.

This application describes methods by which a mobile wireless device can operate in a multiple wireless network environment and determine connections states after connection interruptions between the mobile wireless device and an access network portion of a wireless network.

SUMMARY OF THE DESCRIBED EMBODIMENTS

Broadly speaking, the described embodiments generally relate to methods and apparatuses for managing connections states between mobile wireless devices and wireless networks. More particularly, the present embodiments describe determining connection states between a mobile wireless device and a wireless network after a radio frequency tune-away period.

In an embodiment, a method to determine a connection state by a mobile wireless device in communication with a wireless network is described. The method includes at least the following steps performed by the mobile wireless device. The mobile wireless device detects an interruption of a connection between the mobile wireless device and the wireless network. In response to detecting the interruption of the connection, the mobile wireless device transmits an uplink resource allocation message to the wireless network. In an embodiment, the uplink resource allocation message includes a scheduling request (SR) message for uplink transmission to the wireless network, which operates in accordance with a long term evolution (LTE) wireless communication protocol. When receiving no response from the wireless network to the uplink resource allocation message, the mobile wireless device transmits a random access message to the wireless network. In some embodiments, the random access message includes a unique identifier for the wireless network to associate the resource allocation message with the mobile wireless device. In some embodiments, the unique identifier is a cell radio network temporary identifier (C-RNTI) provided by the wireless network. When receiving no response from the wireless network to the random access message, the mobile wireless device executes a radio link failure procedure. In some embodiments, the radio link failure procedure includes attempting to re-establish a radio resource control (RRC) connection or attempting to establish a new RRC connection with the wireless network.

In another embodiment, a mobile wireless device including one or more processor and wireless circuitry is described. The one or more processors are configured to control establishing and releasing connections between the mobile wireless device and a first wireless network and a second wireless network. The wireless circuitry is configured to transmit signals to the first wireless network according to a first wireless communication protocol and to the second wireless network according to a second wireless communication protocol and to receive signals from the first and second wireless networks. In some embodiments, the first wireless network operates according to an LTE wireless communication protocol and the second wireless network operates according to a third generation (3G) or earlier generation wireless communication protocol. The one or more processors of the mobile wireless device are configured to detect a time period, during which the wireless circuitry is configured for communication with the second wireless network and not configured for communication with the first wireless network, that exceeds an inactivity threshold. In some embodiments, the first wireless network configures a value for the inactivity threshold. The one or more processors of the mobile wireless device are further configured to transmit at least one scheduling request message to the first wireless network, and when receiving no response to the at least one scheduling request message, to execute at least one random access procedure to access the first wireless network. The one or more processors of the mobile wireless device are further configured to execute a radio link failure procedure when receiving no response to the at least one random access procedure from the first wireless network.

In another embodiment, a computer program product encoded as computer program code in a non-transitory computer readable medium for determining connections states by a mobile wireless device in communication with a wireless network is described. The computer program product comprises computer program code for detecting an interruption of a connection between the mobile wireless device and the wireless network; computer program code for transmitting an uplink resource allocation message to the wireless network; computer program code for transmitting a random access message to the wireless network when receiving no response from the wireless network to the uplink resource allocation message; and computer program code for executing a radio link failure procedure when receiving no response from the wireless network to the random access message.

The above summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings, which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

FIG. 1 illustrates components of a generic wireless communication network in accordance with some embodiments.

DETAILED DESCRIPTION OF SELECTED EMBODIMENTS

Figure 1:
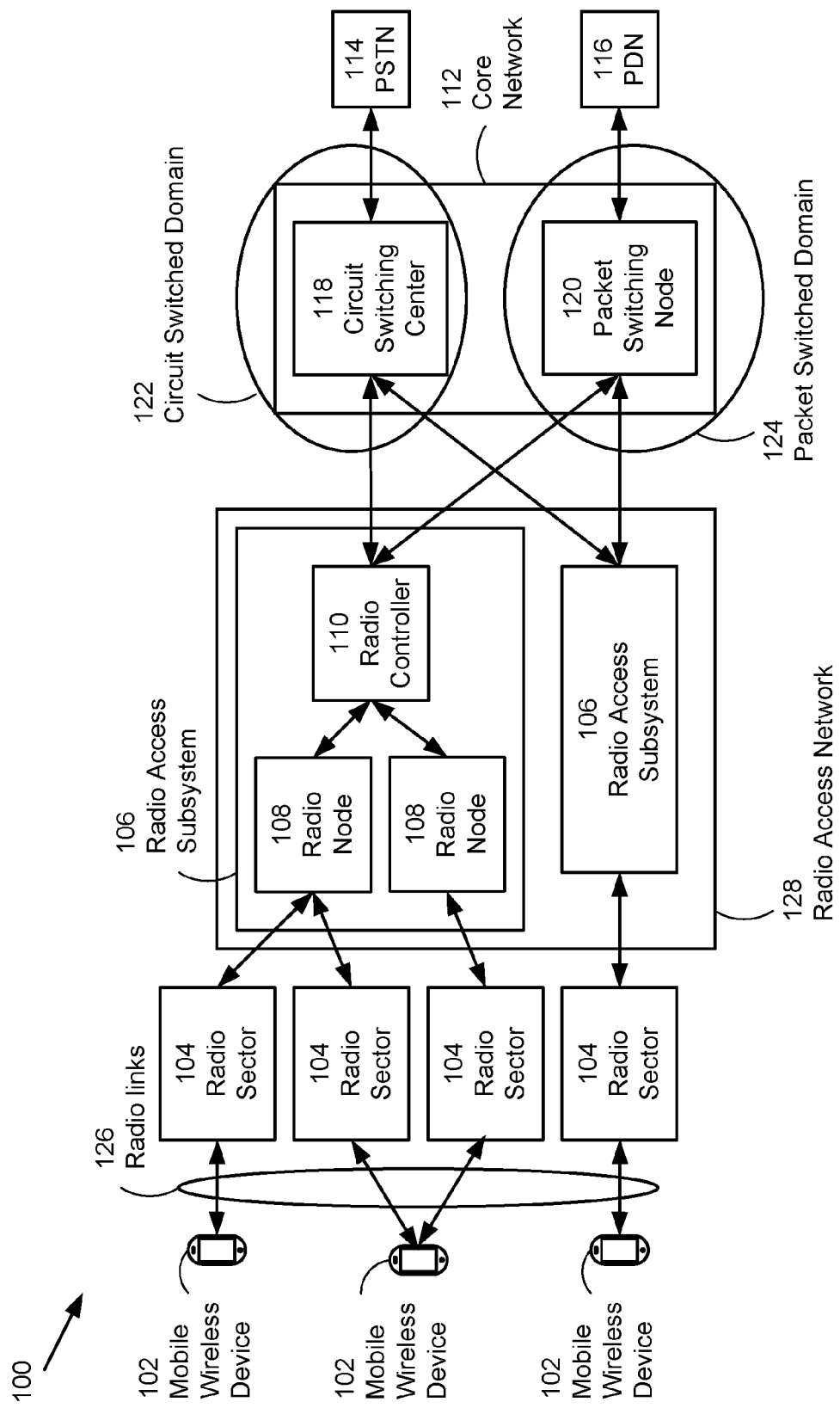

Wireless networks continue to evolve as network operators deploy equipment for new wireless communication technologies based on ongoing standardization efforts. Mobile wireless devices can provide capabilities to communicate with wireless networks based on two or more different wireless communication technologies, e.g. GSM and UMTS, UMTS and LTE, or CDMA 2000 1× and LTE, as newer wireless network technologies offer advanced capabilities in parallel with earlier wireless network technologies that can provide greater geographic area coverage and/or varying wireless service implementations. Different wireless communication technologies can require different hardware and software processing to transmit and receive wireless signals, and a mobile wireless device can include multiple, separate wireless circuitry to encode and decode wireless signals according to different wireless communication technologies. A dual radio mobile wireless device, for example, can include one set of wireless circuitry for a CDMA 2000 1× wireless network and a second set of wireless circuitry for an LTE wireless network. With sufficient parallelism, the dual radio mobile wireless device can communicate with one or both of the wireless networks simultaneously. Dual radio mobile wireless devices, however, can be more complex, larger, more costly and more power intensive than single radio mobile wireless devices. In some embodiments, a single radio mobile wireless device can provide a simpler, smaller, more cost effective and more power efficient mobile wireless device than a dual radio mobile wireless device. The single radio mobile wireless device can communicate with one wireless network at a time out of multiple wireless networks and can provide limited (if any) simultaneous connection capabilities for other parallel wireless networks.

It should be understood that implementations of the same methods and apparatuses described herein can apply to mobile wireless devices that operate in different types of wireless networks, particularly one or more wireless networks that offer connections using two or more different generations or types of wireless communication protocols. For example, the same teachings can be applied to a combination of GSM and UMTS networks, LTE and UMTS networks, LTE and CDMA 2000 1× networks or other "combined" multiple radio access technology (multi-RAT) wireless networks. A specific example and implementation described herein in relation to CDMA 2000 1×-RTT and LTE wireless networks is presented for simplicity, but the methods and apparatuses disclosed herein can also apply equally to other wireless network environments that use other combinations of wireless access communication protocols. The methods and apparatuses described herein can apply to mobile wireless devices in which a connection to a first wireless access network is interrupted and then later resumed. Interruption of the connection between the mobile wireless device and the first wireless access network can occur when the mobile wireless device configures wireless circuitry to operate over a second wireless access network, e.g., to listen for signaling messages from the second wireless access network, thereby interrupting a connection to the first wireless access network, or to transmit signaling message to the second wireless access network, such as when providing a location update. Upon resumption of a connection between the mobile wireless device and the first wireless access network, e.g., in response to reconfiguring the wireless circuitry back to the first wireless access network (from the second wireless access network), a radio resource control (RRC) connection state of the mobile wireless device to the first wireless access network can be indeterminate. In some circumstances, the mobile wireless device can have an internal state indicating an RRC connected state, i.e., the mobile wireless device considers a previously existing RRC connection state to be active and thus the mobile wireless device to be "connected," while the wireless access network can have a state indicating an RRC idle state, i.e., the wireless access network can consider the previously existing RRC connection state to be "released." When an interruption of the RRC connection to the wireless access network is relatively brief, e.g. on the order of 100 milliseconds, the RRC connection state can be unchanged; however, when the interruption of the RRC connection to the wireless access network is relatively long, e.g., on the order of multiple seconds, the wireless access network can release the RRC connection to the mobile wireless device. As the release of the RRC connection can occur when the single radio mobile wireless device is operating on a second wireless access network, any RRC connection release messages from the first wireless access network to the mobile wireless device can be missed. Until the mobile wireless device determines that the RRC connection no longer exists and establishes a new RRC connection state (or re-establishes the previous RRC connection), data transmissions with the first wireless access network can be stalled. Standard recovery techniques can require multiple re-transmission attempts, which can extend an interruption of data transmission with the first wireless access network adversely affecting a user experience. A rapid determination of the RRC connection state upon a return from a protracted connection interruption can provide for quickly recovering a proper connection state between the mobile wireless communication device and continuing user data transmissions as required for applications operating on the mobile wireless device.

In some embodiments described herein, a single radio mobile wireless device can be capable of receiving wireless radio frequency signals from an LTE wireless network or from a CDMA 2000 1× wireless network individually but not from both wireless networks simultaneously (or in some instances, with only limited reception capabilities from both wireless networks simultaneously). Initially, the single radio mobile wireless device can be associated with the LTE wireless network, e.g. connected to or camped on the LTE wireless network. The single radio mobile wireless device can be registered simultaneously with both the LTE wireless network and with the CDMA 2000 1× wireless network. The single radio mobile wireless device can interrupt a packet switched data connection with the LTE wireless network in order to communicate with the CDMA 2000 1× wireless network, e.g., to listen for a page addressed to the mobile wireless device for a mobile terminated circuit switched voice connection to the CDMA 2000 1× wireless network. Alternatively, the single radio mobile wireless device can interrupt the connection with the LTE wireless network in order to communicate with the CDMA 2000 1× wireless network to maintain registration of the mobile wireless device on the CDMA 2000 1× wireless network or to provide location update information to the CDMA 2000 1× wireless network. The single radio mobile wireless device can suspend a packet switched data connection with the LTE wireless network in order to communicate with and/or listen to the CDMA 2000 1× wireless network; however, a higher layer radio resource connection, such as an RRC connection for signaling between the single radio mobile wireless device and the LTE wireless network, can remain undisturbed by the mobile wireless device during the suspension of the packet switched data connection. In some embodiments, the LTE wireless network can be unaware that the mobile wireless device suspended communication and can observe a gap in communication between the LTE wireless network and the mobile wireless device. The single radio mobile wireless device can configure wireless circuitry contained in the single radio mobile wireless device away from the LTE wireless network and to the CDMA 2000 1× wireless network to listen for paging messages from the CDMA 2000 1× wireless network or to transmit signaling messages to the CDMA 2000 1× wireless network. The single radio mobile wireless device can subsequently re-configure the wireless circuitry back to the LTE wireless network. Interruption of the packet switched data connection (and of a parallel higher layer signaling connection) to the LTE wireless network can be accommodated without the LTE wireless connection being dropped, e.g., when the interruption is less than any timer expiration limits that would precipitate the LTE wireless network dropping the connection with the mobile wireless device. Active data transfer between the LTE wireless network and the single radio mobile wireless device as well as signaling messages during the suspension period can be interrupted and later resumed when the mobile wireless device returns to the LTE wireless network. During the interruption, the LTE wireless network can send data packets and/or signaling messages to the mobile wireless device and can receive no acknowledgement (ACK) messages or any negative acknowledgement (NACK) messages in response, and after a period of time, the LTE wireless network can interpret the interruption as a loss of the RRC connection to the mobile wireless device. The LTE wireless network can release the RRC connection by sending explicitly an RRC connection release message to the mobile wireless device and change a state for the mobile wireless device maintained by the LTE wireless network from an RRC connected state to an RRC idle state. When the mobile wireless device is connected to the CDMA 2000 1× wireless network, the mobile wireless device can miss the RRC connection release message from the LTE wireless network. Similarly, during an extended interruption of the connection to the LTE wireless network, no uplink transmissions or requests for scheduling resources for uplink transmission can occur. With an extended period of data inactivity, the LTE wireless network can release the RRC connection to the mobile wireless device.

Upon returning to the LTE wireless network after a long interruption, the mobile wireless device can determine an RRC connection state quickly by sending a scheduling request (SR) message to the LTE wireless network. The mobile wireless device can send the SR message irrespective of whether transmit buffers in the mobile wireless device include pending uplink data. If the LTE wireless network provides a positive response to the SR message, then the RRC connection state can be still active, and the mobile wireless device can respond by sending a buffer status report to the LTE wireless network. The positive response to the SR message from the LTE wireless network can provide a quick indication of the RRC connection state to the mobile wireless device. If the LTE wireless network does not provide a positive response to the SR message, then the mobile wireless device can execute a random access procedure, e.g., as can be performed to acquire uplink timing synchronization after an extended gap in uplink transmissions for an existing RRC connection. The mobile wireless device can include a unique identifier, e.g., a cell radio network temporary identifier (C-RNTI), associated with the existing RRC connection, in the random access procedure. If the LTE wireless network provides a positive response to the random access procedure, the RRC connection state can still be active, and the mobile wireless device can continue to communicate with the LTE wireless network per normal procedures. The positive response to the random access procedure from the LTE wireless network can provide another quick indication of the RRC connection state to the mobile wireless device. When the mobile wireless device does not receive a positive response to the SR message or the random access procedure from the LTE wireless network, the mobile wireless device can determine a radio link failure has occurred and initiate an appropriate recovery procedure. By probing the LTE wireless network with an SR message and a random access procedure, without using a long repeated series of SR messages and/or a long repeated series of random access procedures, the mobile wireless device can more rapidly determine an RRC connection state with the LTE wireless network and take appropriate actions to recover when required.

When determining that a radio link failure has occurred, the mobile wireless device can remedy the failure by re-establishing the previous RRC connection to the LTE wireless network or by establishing a new RRC connection to the LTE wireless network. In an embodiment, the mobile wireless device updates an internal state of the mobile wireless device from an RRC connected state to an RRC idle state, thereby releasing internally the RRC connection to the LTE wireless network. The mobile wireless device then establishes a new RRC connection to the LTE wireless network. In another embodiment, the mobile wireless device sends an RRC re-establishment request message to the LTE wireless network to re-establish the RRC connection.

FIG. 1 illustrates a representative generic wireless network 100 that can include multiple mobile wireless devices 102 connected by radio links 126 to radio sectors 104 provided by a radio access network 128. Each radio sector 104 can represent a geographic area of radio coverage emanating from an associated radio node 108 using a radio frequency channel operating at a selected frequency. Each radio node 108 can generate one or more radio sectors 104 to which the mobile wireless device 102 can connect by one or more radio links 126. In some wireless networks 100, the mobile wireless device 102 can be connected to more than one radio sector 104 simultaneously. The multiple radio sectors 104 to which the mobile wireless device 102 can be connected can emanate from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the mobile wireless device 102 to the radio access network 128.

Radio resources that form the radio links 126 in the radio sectors 104 can be shared among multiple mobile wireless devices 102 using a number of different multiplexing techniques, including time division, frequency division, code division, space division and combinations thereof. A radio resource control (RRC) signaling connection can be used to communicate between the mobile wireless device 102 and the radio controller 110 in the radio access subsystem 106 of the radio access network 128 including requests for and dynamic allocations of radio resources to multiple mobile wireless devices 102. Suspension of allocation of radio resources to a mobile wireless device 102 can occur without dis-establishing the RRC signaling connection to the mobile wireless device 102.

The radio access network 128, which provides radio frequency air link connections to the mobile wireless device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
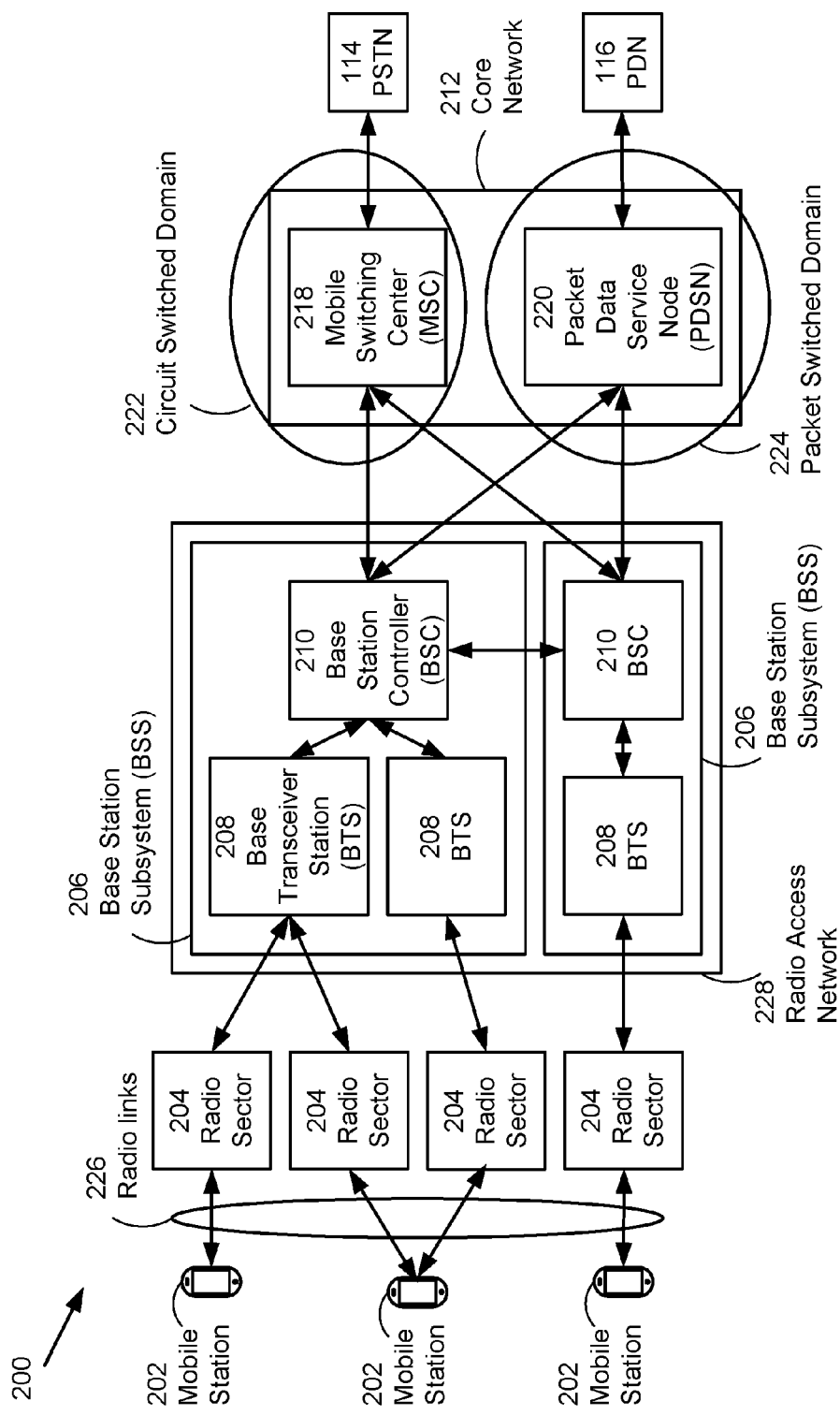
FIG. 2 illustrates components of a CDMA 2000 1× (RTT or EV-DO) wireless communication network in accordance with some embodiments.

FIG. 2 illustrates a representative CDMA 2000 1x wireless network 200 that can include elements comparable to those described for the generic wireless network 100 shown in FIG. 1. Multiple mobile stations 202 can connect to one or more radio sectors 204 through radio frequency links 226. Each radio sector 204 can radiate outward from a base transceiver station (BTS) 208 that can connect to a base station controller (BSC) 210, together forming a base station subsystem (BSS) 206. Multiple base station subsystems 206 can be aggregated to form a radio access network 228. Base station controllers 210 in different base station subsystems 206 can be interconnected. The base station controllers 210 can connect to both a circuit switched domain 222 that use multiple mobile switching centers (MSC) 218 and a packet switched domain 224 formed with packet data service nodes (PDSN) 220, which together can form a core network 212 for the wireless network 200. As with the generic wireless network 100 described above, the circuit switched domain 222 of the core network 212 can interconnect to the PSTN 114, while the packet switched domain 224 of the core network 212 can interconnect to the PDN 116. Establishing connections on the CDMA 2000 1x wireless network 200 can depend on the mobile station 202 receiving a page from the BSS 206 indicating an incoming connection. The mobile station 202 can be required to listen for pages during specific paging intervals. Without reception of the page, the mobile station 202 can be unaware of a request to form a connection between the mobile station 202 and the CDMA 2000 1x wireless network 200.

Figure 3:
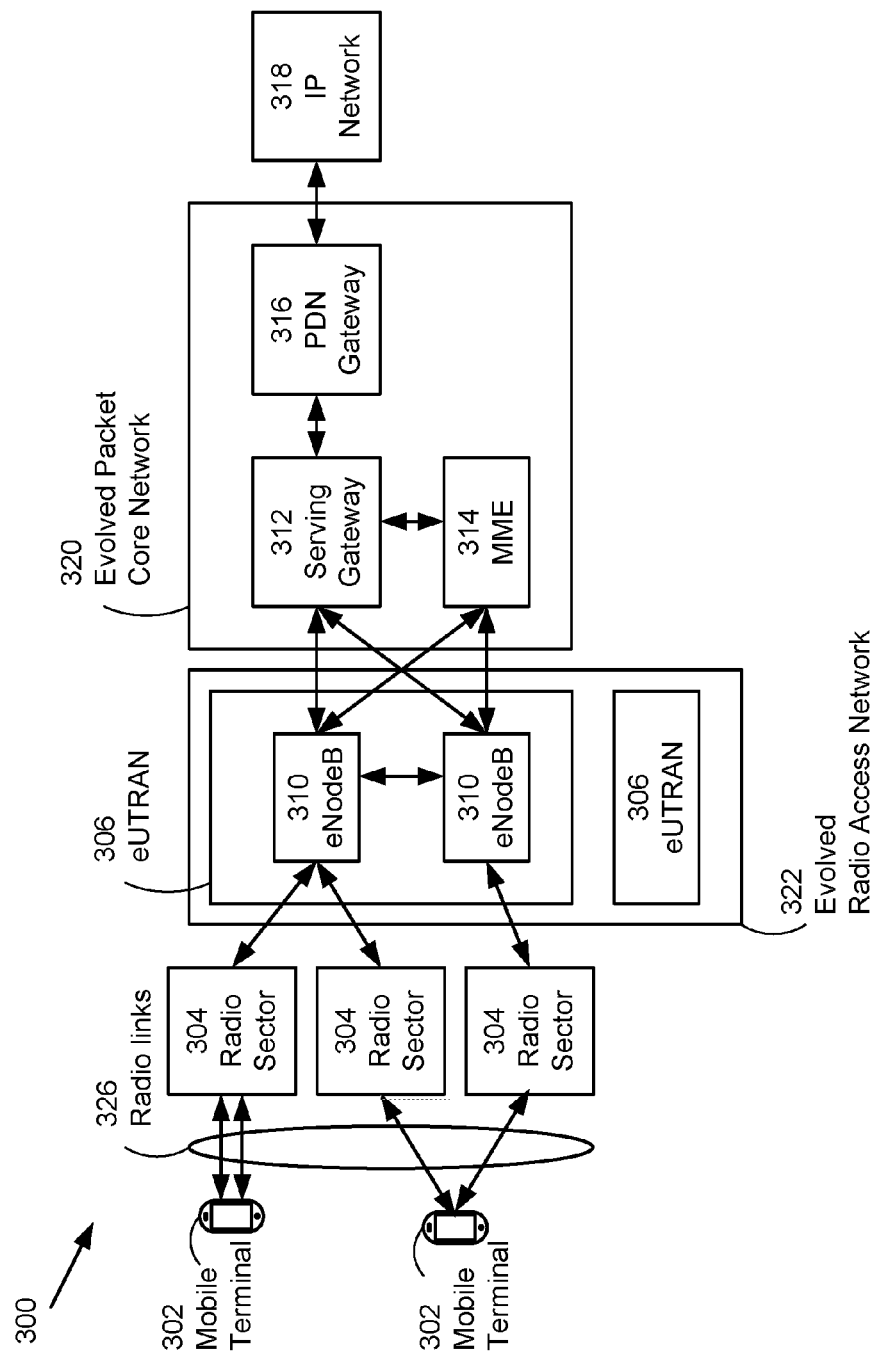
FIG. 3 illustrates components of an LTE (or LTE-Advanced) wireless communication network in accordance with some embodiments.

FIG. 3 illustrates a representative Long Term Evolution (LTE) wireless network 300 architecture designed as a packet switched network exclusively. A mobile terminal 302 can connect to an evolved radio access network 322 through radio links 326 associated with radio sectors 304 that emanate from evolved Node B's (eNodeB) 310. The eNodeB 310 includes the functions of both transmitting and receiving base stations (such as the BTS 208 in the CDMA 2000 1x wireless network 200) as well as base station radio controllers (such as the BSC 210 in the CDMA 2000 1x wireless network 200). The equivalent core network of the LTE wireless network 300 is an evolved packet core network 320 including serving gateways 312 that interconnect the evolved radio access network 322 to public data network (PDN) gateways 316 that connect to external internet protocol (IP) networks 318. Multiple eNodeB 310 can be grouped together to form an eUTRAN 306. The eNodeB 310 can also be connected to a mobility management entity (MME) 314 that can provide control over connections for the mobile terminal 302. The eNodeB 310 can control allocation of radio resources for the radio links 326 to the mobile terminals 302. The eNodeB 310 can communicate paging messages to the mobile wireless device 102, including paging messages to establish an RRC connection with the mobile wireless device 102 and transition from an RRC idle state to an RRC connected state. The eNodeB 310 can also communicate an RRC connection release message with the mobile wireless device 102 and transition from the RRC connected state to the RRC idle state. The mobile wireless device 102 can be required to be in an RRC connected state in order to communicate application data packets and signaling messages.

Figure 4:
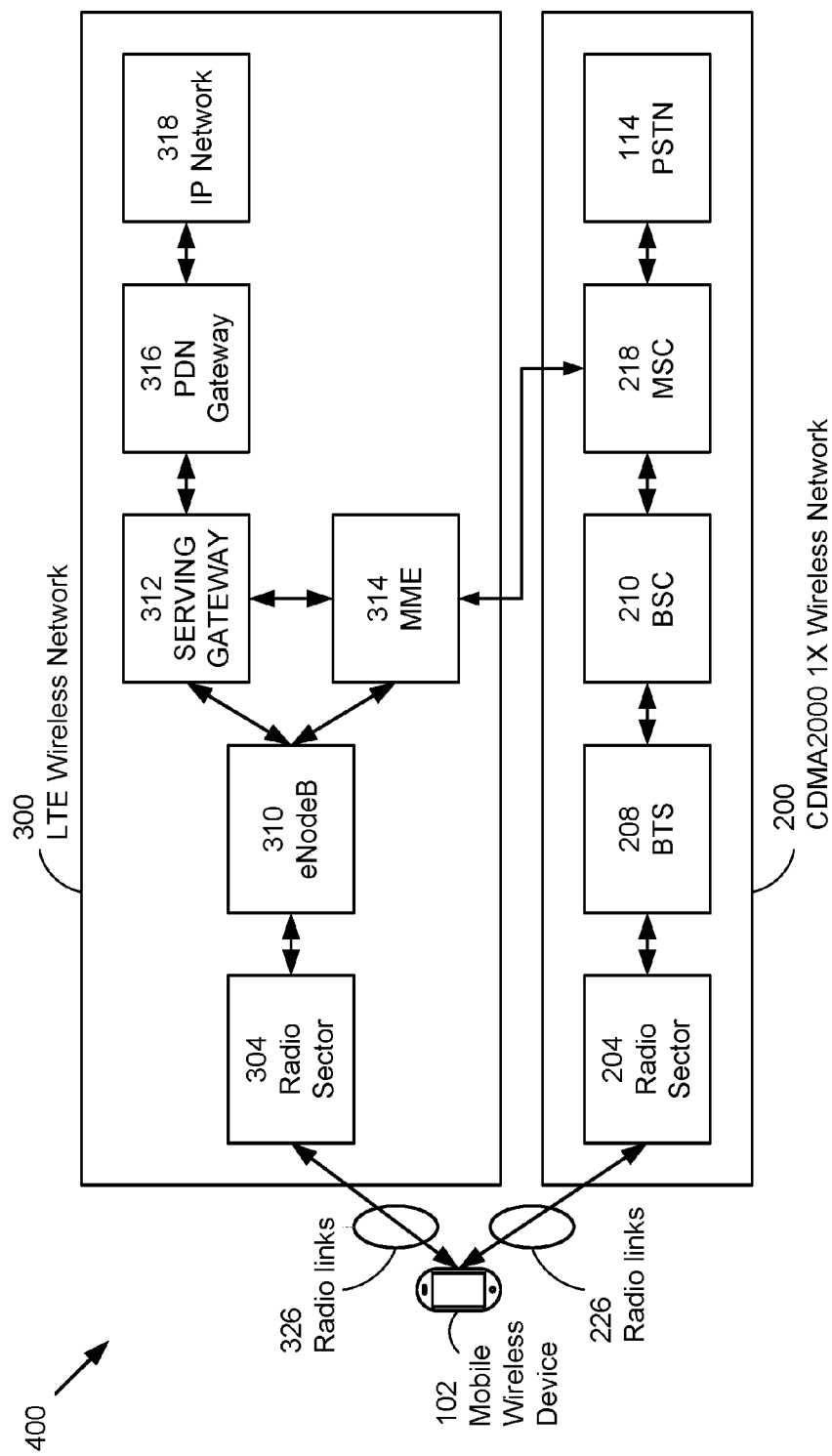
FIG. 4 illustrates a mobile wireless device communicating in parallel to the CDMA 2000 1× (RTT or EV-DO) wireless communication network of FIG. 2 and the LTE (or LTE-Advanced) wireless communication network of FIG. 3 in accordance with some embodiments.

FIG. 4 illustrates a mobile wireless device 102 in communication with both the LTE wireless network 300 and with the CDMA 2000 1x wireless network 200. The CDMA 2000 1x wireless network 200 can connect to the circuit switch based public switched telephone network (PSTN) 114 through a mobile switching center (MSC) 218. In some embodiments, the MSC 218 of the CDMA 2000 1× wireless network 200 can be interconnected to the MME 314 of the LTE wireless network 300 to coordinate call signaling for the mobile wireless device 102. In some embodiments (not shown), the MME 314 and the MSC 218 can be not interconnected or have limited connectivity, so that the mobile wireless device 102 can maintain separate registrations and connections with the LTE wireless network 300 and the CDMA 2000 1× wireless network 200. In some embodiments, the CDMA 2000 1× wireless network 200 can seek to establish a connection through the radio links 226 with the mobile wireless device 102, e.g. to establish a voice connection between the mobile wireless device 102 and the PSTN 114. The CDMA 2000 1× wireless network 200 can transmit a page message to the mobile wireless device 102 using the radio links 226 to indicate the availability of an incoming voice connection. Unless a receiver in the mobile wireless device 102 is tuned to listen for the page message from the CDMA 2000 1× wireless network 200 during the appropriate paging interval, the mobile wireless device 102 can be unaware of the incoming voice connection. A dual radio mobile wireless device 102 can be connected to the LTE wireless network 300 and listen to the CDMA 2000 1× wireless network 200 simultaneously, but a single radio mobile wireless device 102 with limited receive capabilities can be only capable of listening to one cellular wireless network at a time. The single radio mobile wireless device 102 can periodically listen for page messages from the CDMA 2000 1× wireless network 200 by tuning wireless circuitry from the LTE wireless network 300 to the CDMA 2000 1× wireless network 200 temporarily and subsequently re-tuning the wireless circuitry back to the LTE wireless network 300. Signaling messages and/or data packets from the LTE wireless network 300 can be dropped while the signal radio mobile wireless device 102 listens for messages from or communicates signaling messages to the CDMA 2000 1× wireless network 200. When the mobile wireless device 102 is "tuned away" to the CDMA 2000 1× wireless network 200 for an extended period of time, the LTE wireless network 300 can conclude that the communication link to the mobile wireless device 102 is broken and/or inactive, and the LTE wireless network 300 can transition to an RRC idle state, thereby severing the RRC connection with the mobile wireless device 102. The LTE wireless network 300 can transmit an RRC connection release message to the mobile wireless device 102 to indicate the change in RRC connection state; however, when the mobile wireless device 102 is "tuned away" to the CDMA 2000 1× wireless network 200, the mobile wireless device 102 can miss the RRC connection release message. As a result, when the mobile wireless device 102 returns to communicating over the radio links 326 to the radio sector 304 of the eNodeB 310 of the LTE wireless network 300, the RRC connection states of the mobile wireless device 102 and the eNodeB 310 of the LTE wireless network 300 can be misaligned.

After returning from a "tune-away" period, the mobile wireless device 102 can request a radio resource allocation in order to transmit uplink data by sending a scheduling request (SR) message to the LTE wireless network 300. If the LTE wireless network 300 has released the previous RRC connection, e.g., due to an extended inactivity time period, the mobile wireless device 102 may not receive a response to the SR message. After a timeout period, the mobile wireless device 102 can repeat sending the SR message up to a pre-determined number of times, e.g., as configured by the LTE wireless network 300. In some embodiments, the maximum number of SR transmission attempts can be configured by the LTE wireless network 300 to be 4, 8, 16, 32 or 64. In a representative embodiment, the LTE wireless network configures the maximum number of SR transmission attempts equal to 64. When the mobile wireless device 102 reaches the maximum allowed number of SR transmissions, the mobile wireless device 102 can initiate a random access procedure as an alternate method to receive a resource allocation for uplink transmission. During the random access procedure, the mobile wireless device 102 can transmit a preamble message followed by a layer 3 message that includes a unique identifier, e.g., the cell radio network temporary identifier (C-RNTI), corresponding to the RRC connection between the mobile wireless device 102 and the eNodeB 310 of the LTE wireless network 300. If the LTE wireless network 300 has released the previous RRC connection, the mobile wireless device 102 may not receive a response to the layer 3 message that included the C-RNTI. After another timeout period, the mobile wireless device 102 can repeat the random access procedure up to a pre-determined number of times, e.g., as set by the LTE wireless network 300. In some embodiments, the maximum number of random access procedure attempts can be configured by the LTE wireless network 300 to be 3, 4, 5, 6, 7, 8, 10, 20, 50, 100, or 200. In a representative embodiment, the LTE wireless network configures the maximum number of random access preamble transmissions equal to 20. When the mobile wireless device 102 reaches the maximum allowed number of random access procedure preamble transmissions, the mobile wireless device 102 can declare a radio link failure. The cumulative time to transmit all of the repeated SR messages and to execute the repeated random access procedures can result in an extended period of time in which the mobile wireless device 102 cannot transmit data messages to or receive data messages from the LTE wireless network 300. The data interruption can interfere with the performance of applications running on the mobile wireless device 102, e.g., a video call using a packet data connection, a streaming media application, or an internet browsing session, which can negatively impact a user's wireless experience.

Figure 5:
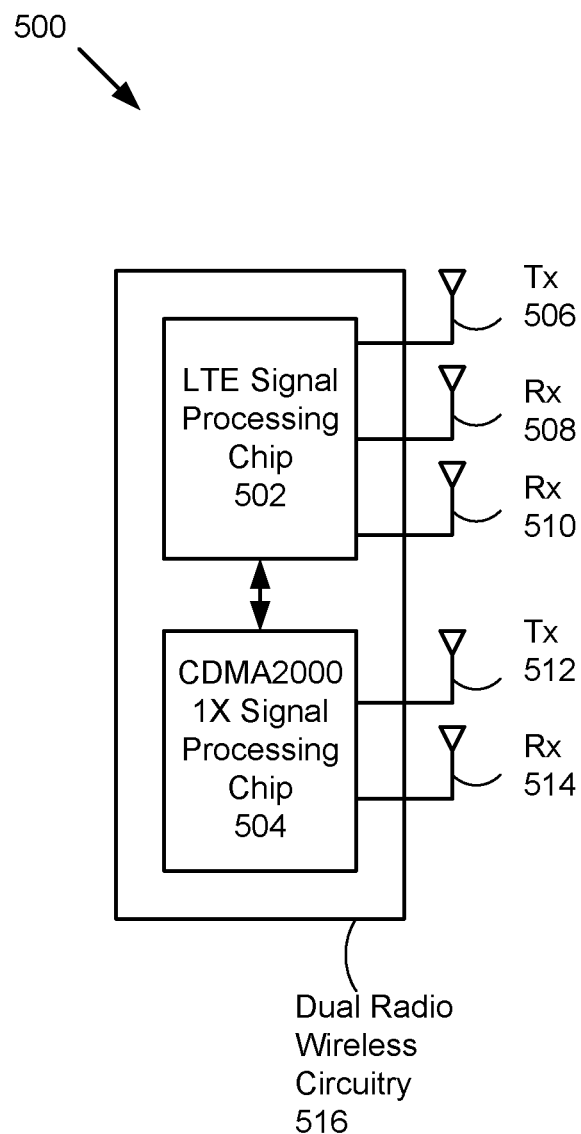
FIG. 5 illustrates elements of a dual radio mobile wireless device in accordance with some embodiments.

FIG. 5 illustrates select wireless signal processing elements 500 that can be contained in dual radio wireless circuitry 516 within a dual radio mobile wireless device 102. An LTE signal processing radio 502 can be used for connections between the dual radio mobile wireless device 102 and the LTE wireless network 300, while a CDMA 2000 1× signal processing radio 504 can be used for connections between the dual radio mobile wireless device 102 and the CDMA 2000 1× wireless network 200. Each signal processing radio can be connected to a set of antennas through which radio frequency signals can be transmitted and received with respective wireless networks. The LTE signal processing radio 502 can be connected to a transmitting antenna 506 and to a pair of receive antennas 508/510. Multiple receive antennas can be used to improve performance through various forms of receive diversity and can be required based on a standardized wireless communication protocol. With the separate CDMA 2000 1× signal processing radio 504, the dual radio mobile wireless device 102 can transmit and receive radio frequency signals with the CDMA 2000 1× wireless network 200 through a transmit antenna 512 and a receive antenna 514, while simultaneously transmitting and receiving radio frequency signals with the LTE wireless network 300 through the separate transmit antenna 506 and receive antennas 508/510. The LTE signal processing radio 502 and the CDMA 2000 1× signal processing radio 504 can be connected to each other in order to coordinate radio frequency signal communication with their respective wireless networks. The dual radio wireless transmitter/receiver 516, while flexible, can be more expensive, consume more power and occupy more space than a compact, low power single radio wireless transmitter/receiver as shown in FIG. 6.

Figure 6:
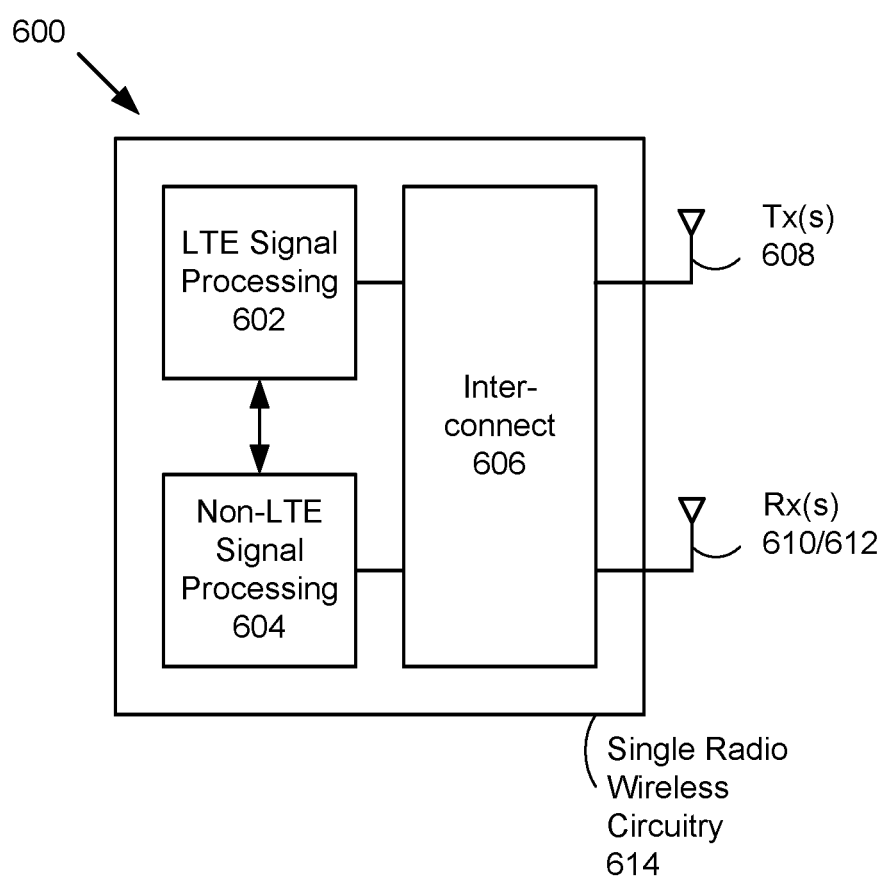
FIG. 6 illustrates elements of a representative single radio mobile wireless device in accordance with some embodiments.

FIG. 6 illustrates single radio wireless circuitry 614 that can reside in a single radio wireless mobile wireless device 102 that can communicate with the LTE wireless network 300 or the CDMA 2000 1× wireless network 200 separately but not simultaneously. When connected to the LTE wireless network 300, the single radio mobile wireless device 102 can use a single transmitter (Tx) 608 and dual receivers (Rx) 610/612. When connected to the CDMA 2000 1× wireless network 200, the single radio mobile wireless device 102 can use the single transmitter 608 and either one receiver (Rx 610 or Rx 612) or dual receivers (Rx 610 and Rx 612). Use of dual receivers for both the LTE wireless network 300 and the CDMA 2000 1× wireless network 200 can provide higher receive signal quality and therefore higher data throughput and/or greater connection reliability under adverse signal conditions. An interconnect block 606 can allow either an LTE signal processing 602 block or a CDMA 2000 1× signal processing block 604 to transmit and receive radio signals through the transmitter 608 and one or both of the receivers 610/612 respectively. Within the single radio wireless mobile wireless device 102, the single radio wireless transmitter/receiver 614 can be connected to an application processor (not shown) that can perform "higher layer" functions such as establishing connections for applications and forming messages to be communicated with various wireless networks, while the single radio wireless circuitry 614 can perform "lower layer" functions such as ensuring integrity of transmitted and received radio frequency signals that carry messages for the application processor.

Figure 7:
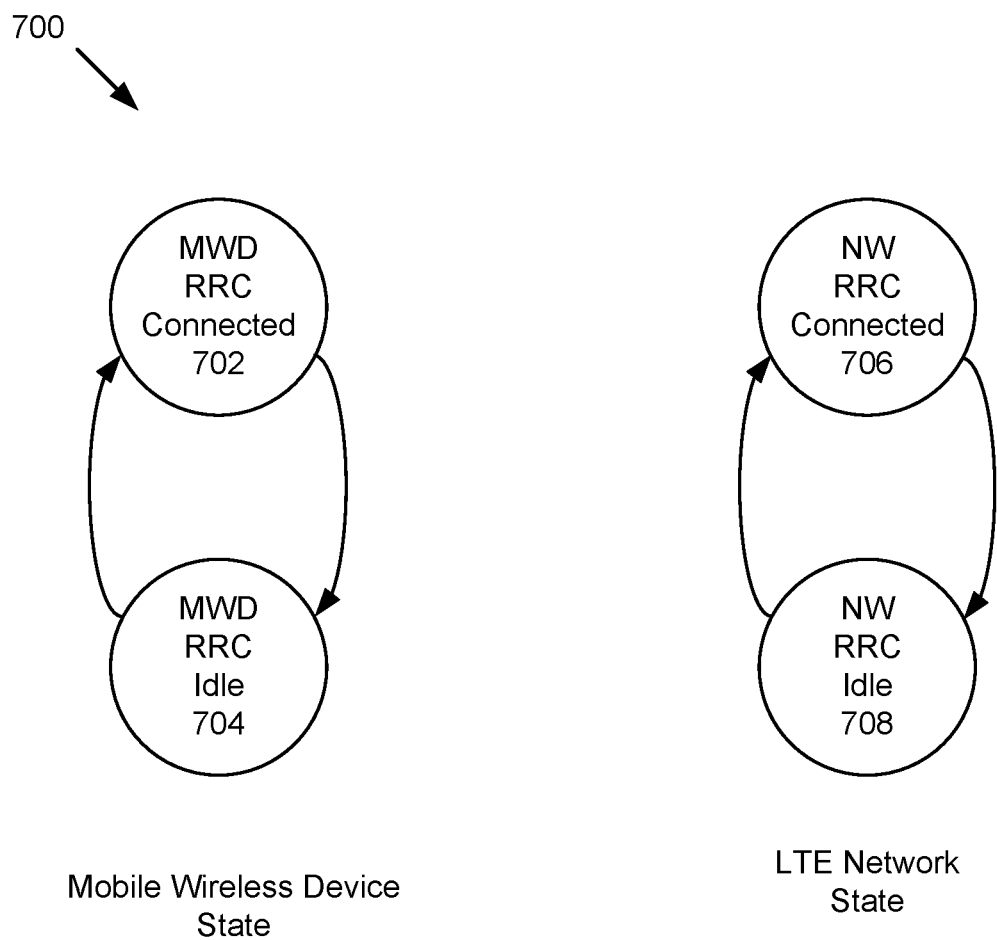
FIG. 7 illustrates radio resource control (RRC) connection states for a mobile wireless device and a wireless access network in accordance with some embodiments.

FIG. 7 illustrates a state diagram 700 for radio resource control (RRC) connection states for the mobile wireless device 102 and a wireless access network, e.g., the LTE wireless network 300 (or an eNodeB 310 contained therein). The mobile wireless device 102 can be in an RRC connected state 702 or in an RRC idle state 704. Similarly the LTE wireless network 300 can be in an RRC connected state 706 or an RRC idle state 708. An RRC connection establishment procedure can be used to transition the mobile wireless device 102 and the LTE wireless network 300 from an RRC idle state 704/708 to an RRC connected state 702/704. When the RRC connection state of the LTE wireless network 300 does not match the RRC connection state of the mobile wireless device 102, a state mismatch, or equivalently a state synchronization failure, can occur. The state synchronization failure can occur when the mobile wireless device 102 tunes wireless circuitry therein to a second wireless network (e.g., the CDMA 2000 1× wireless network 200) to listen for signaling messages (e.g. pages) or to transmit signaling messages (e.g. location updates). If the "tune away" time period extends for a "long" period of time, e.g., over which one or more timers can expire at the eNodeB 310 of the LTE wireless network 300, the eNodeB 310 can drop the RRC connection with the mobile wireless device 102 and return to the RRC idle state 708, while the mobile wireless device 102 can remain (internally) in the RRC connected state 702.

Figure 8:
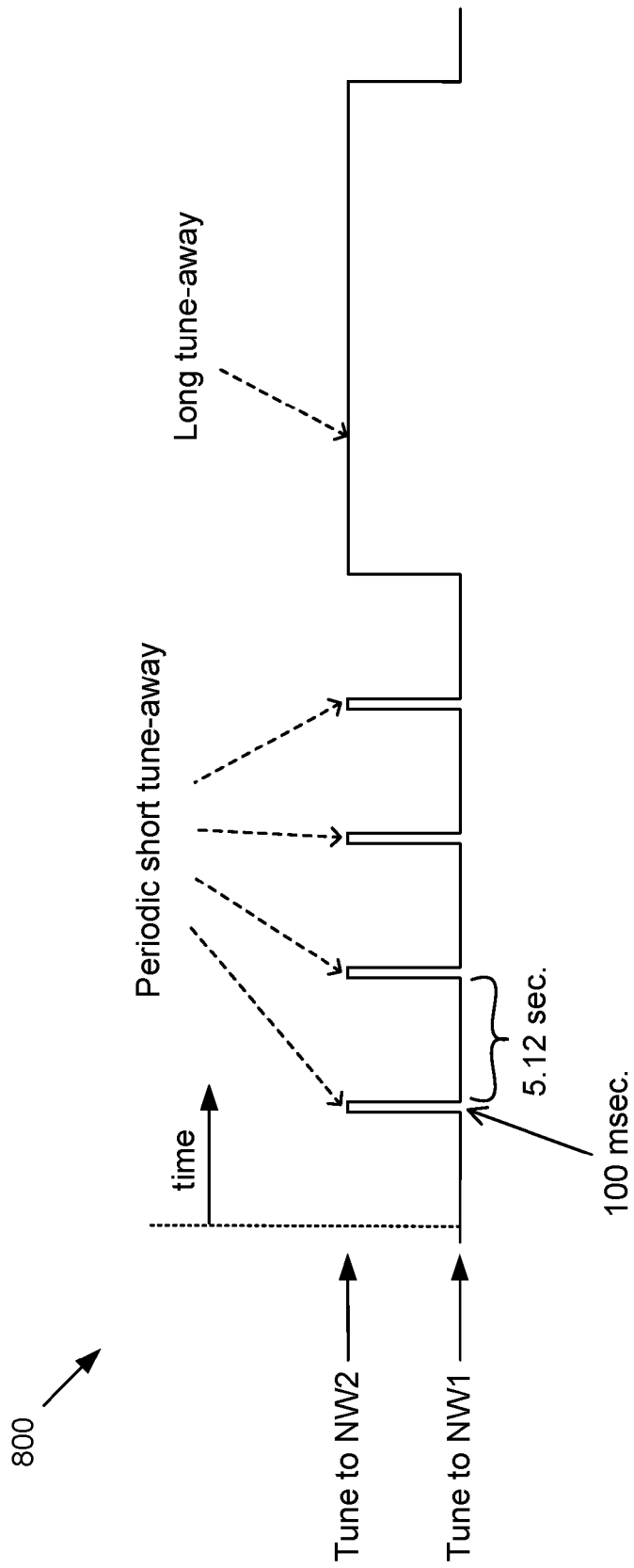
FIG. 8 illustrates configuring and reconfiguring wireless circuitry of a mobile wireless device to communicate over two different wireless access networks in accordance with some embodiments.

FIG. 8 illustrates configuring and reconfiguring of wireless circuitry of the mobile wireless device 102 to two different wireless access networks, e.g., the LTE wireless network 300 (NW1) and the CDMA 2000 1× wireless network 200 (NW2). The mobile can be capable of receiving wireless radio frequency signals from the LTE wireless network 300 or from a CDMA2000 1× wireless network 200 individually but not from both wireless networks simultaneously (or in some instances, with only limited reception capabilities from both wireless networks simultaneously). Initially, the mobile wireless device 102 can be associated with the LTE wireless network 300, e.g. connected to or camped on the LTE wireless network 300. In an embodiment, the mobile wireless device 102 can be registered simultaneously with both the LTE wireless network 300 and with the CDMA2000 1× wireless network 200. The CDMA2000 1× wireless network 200 can seek to establish a connection with the mobile wireless device 102 by sending a paging message including a page addressed to mobile wireless device 102 during a paging interval. The mobile wireless device 102 can tune a receiver away from the LTE wireless network 300 and to the CDMA2000 1× wireless network 200 to listen for a paging message that includes a page addressed to the mobile wireless device 102. If no paging message that includes a page addressed to the mobile wireless device 102 is received from the CDMA2000 1× wireless network 200, then the mobile wireless device 102 can retune the receiver back to the LTE wireless network 300 in a relatively short time period, e.g. within approximately 100 ms. In order to listen for pages addressed to the mobile wireless device 102 from the CDMA2000 1× wireless network (NW2), the mobile wireless device 102 can tune a receiver to the CDMA2000 1× wireless network 200 during regular paging intervals. In an embodiment, a CDMA2000 1× wireless network 200 can operate with a paging cycle of approximately 5.12 seconds. This process of listening for pages from a second wireless network with a paging cycle of 5.12 seconds and quickly retuning back to a first wireless network (i.e., within 100 ms) is shown in FIG. 8 as a periodic short tune away.

After receiving a page addressed to the mobile wireless device 102 from the CDMA2000 1× wireless network 200, the mobile wireless device 102 can establish a connection with the CDMA2000 1× wireless network 200. The connection between the mobile wireless device 102 and the CDMA2000 1× wireless network 200 can result in a long interruption to data traffic and signaling traffic between the mobile wireless device 102 and the LTE wireless network 300. This long connection to the CDMA 2000 1× wireless network (NW2) is shown as a long tune away in FIG. 8. Downlink and uplink radio resources assigned by the LTE wireless network 300 to the mobile wireless device 102 can remain unused during this long interruption if not suspended beforehand, which can unnecessarily waste scarce radio resources in the access network portion of the LTE wireless network 300. A radio resource control (RRC) connection to the LTE wireless network (NW 1) can eventually time out due to a lack of acknowledgements being sent from the mobile wireless device 102 to the LTE wireless network 300 and/or from an expiration of an inactivity timer at the LTE wireless network 300. The LTE wireless network 300 can send an RRC connection release message to the mobile wireless device 102, and the RRC connection at the eNodeB 310 of the LTE wireless network 300 can change to the RRC idle state 708. Thus, the RRC connection between the mobile wireless device 102 and the LTE wireless network 300 can be dropped. After tuning the wireless circuitry of the mobile wireless device 102 back to the LTE wireless network 300, the mobile wireless device 102 can be required to re-establish a new RRC connection with the LTE wireless network 300 in order to communication with the LTE wireless network 300. The mobile wireless device 102 can be unaware of the change of RRC connection state at the eNodeB 310 of the LTE wireless network 300 and can continue to assume an RRC connected state 702. Therefore, a long tune away having an extended time period can result in interrupted communication between the mobile wireless device 102 and the LTE wireless network 300 and can result in a misaligned RRC connection state between the mobile wireless device 102 and the LTE wireless network 300.

Figure 9:
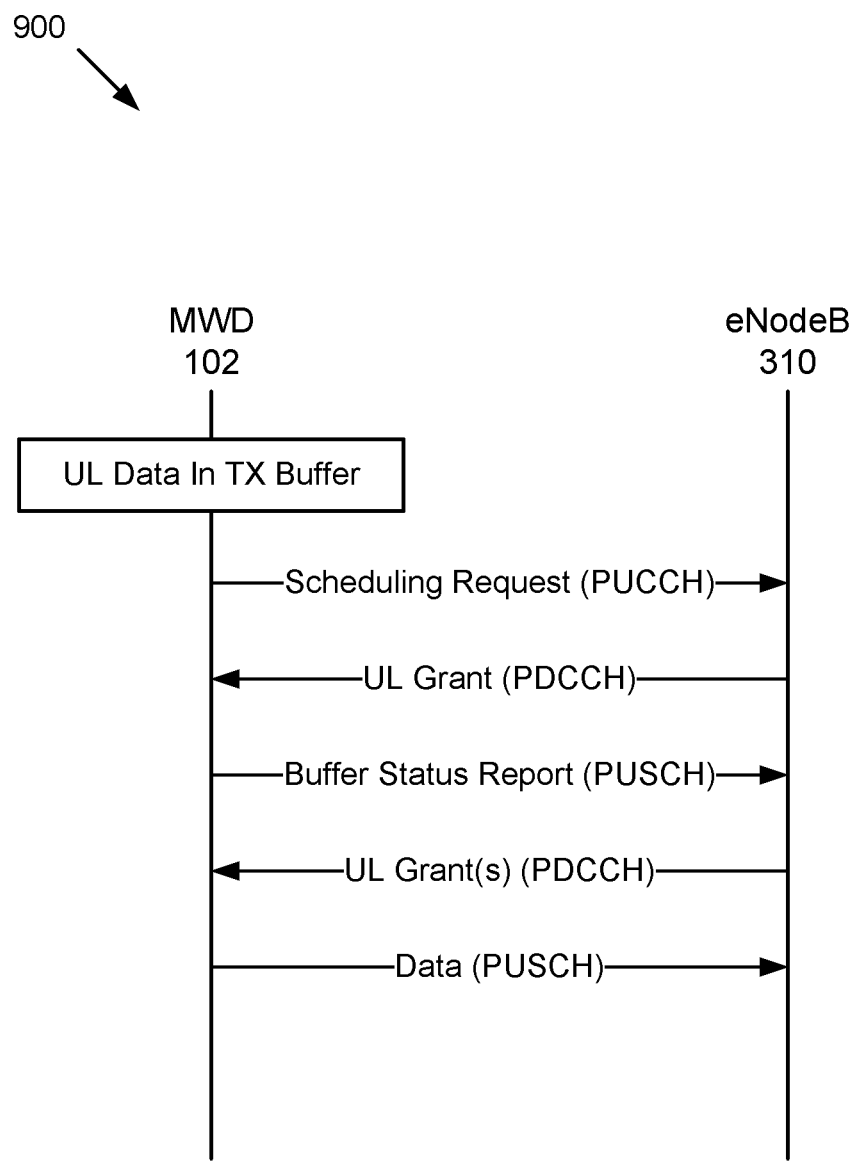
FIG. 9 illustrates a representative message exchange between a mobile wireless device and a wireless access network to request scheduling of uplink transmission in accordance with some embodiments.

FIG. 9 illustrates a message exchange sequence 900 between the mobile wireless device 102 and the eNodeB 310 of the LTE wireless network 300. When a transmit (TX) buffer in the mobile wireless device 102 contains pending uplink (UL) data to send to the LTE wireless network 300, the mobile wireless device 102 can send a scheduling request (SR) message using a physical uplink control channel (PUCCH) to the eNodeB 310. The SR message can directly or indirectly identify the mobile wireless device 102 in some embodiments, e.g., by using a particular uplink radio resource on which to transmit the SR message or by providing an identity in the SR message. The eNodeB 310, in response, can provide an uplink grant to the mobile wireless device 102 on which to receive more information about the pending data. The UL grant can be transmitted on a physical downlink control channel (PDCCN) from the eNodeB 310 to the mobile wireless device 102. The mobile wireless device 102 can respond by sending a buffer status report to the eNodeB 310 to provide information about the pending uplink data in buffers of the mobile wireless device 102. The eNodeB 310 can subsequently respond by providing one or more uplink grants of radio resources to the mobile wireless device 102 on which to transport all or a portion of the pending uplink data. The UL grants can be transmitted over the PDCCH, while the UL data can be transported over a physical uplink shared channel (PUSCH) during time/frequency slots as specified in the UL grants. When the RRC connection between the mobile wireless device 102 and the eNodeB 310 has been released, the eNodeB 310 may not respond to the SR sent by the mobile wireless device 102.

Figure 10:
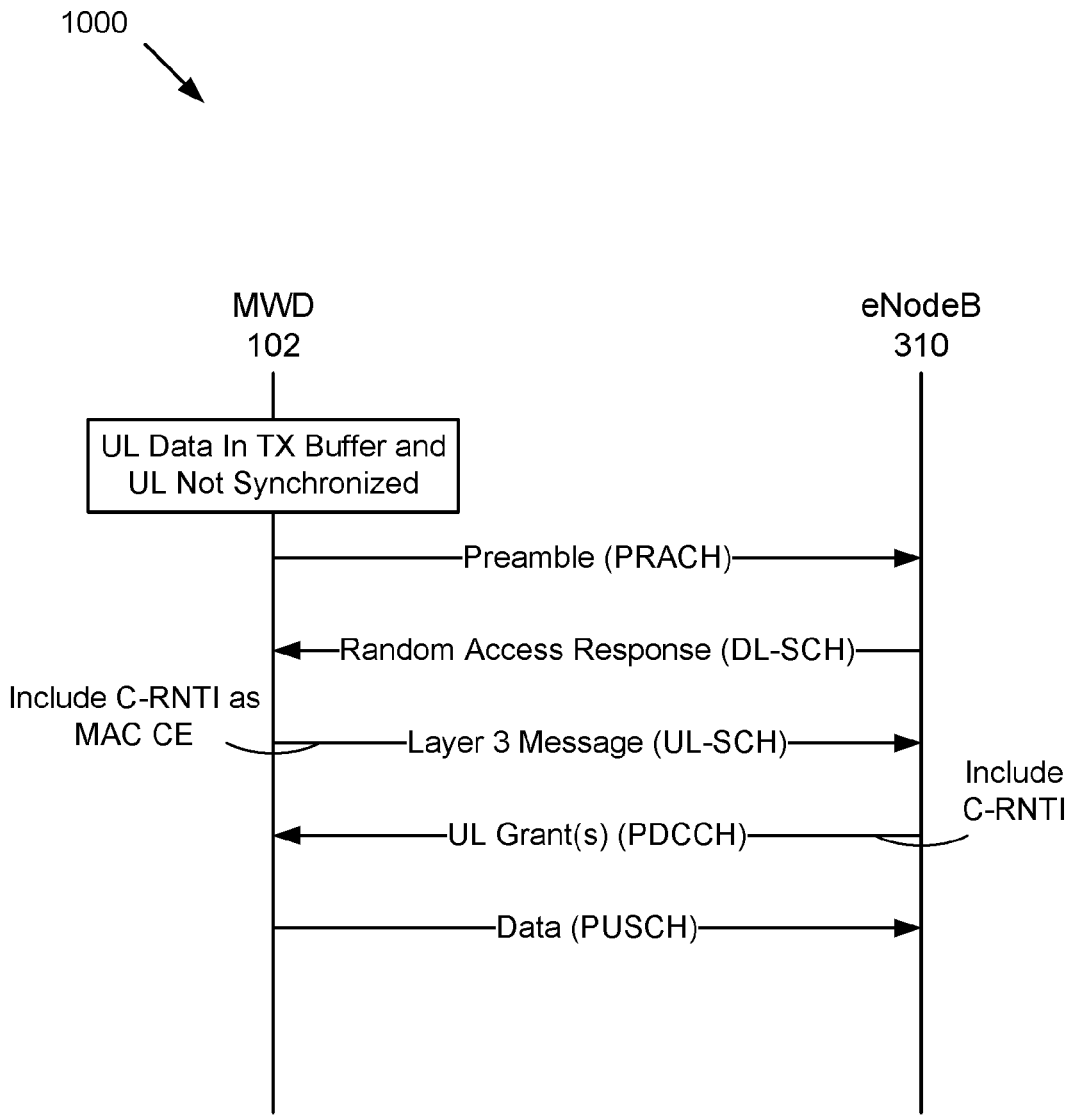
FIG. 10 illustrates a representative message exchange between a mobile wireless device and a wireless access network for a random access procedure in accordance with some embodiments.

FIG. 10 illustrates a message exchange sequence 1000 between the mobile wireless device 102 and the eNodeB 310 of the LTE wireless network 300. When a transmit (TX) buffer in the mobile wireless device 102 contains pending uplink (UL) data to send to the LTE wireless network 300 and the uplink is not synchronized, the mobile wireless device 102 can perform a random access procedure to acquire uplink synchronization timing and subsequently receive uplink grants to transmit the pending uplink data to the LTE wireless network 300. The mobile wireless device 102 transmits a preamble on a physical random access channel (PRACH) to the eNodeB 310 of the LTE wireless network 300. The eNodeB 310 responds with a random access response on a downlink shared channel (DL-SCH). The mobile wireless device 102 responds on an uplink shared channel (UL-SCH) with a layer 3 message that includes a unique identifier for the RRC connection between the mobile wireless device 102 and the eNodeB 310, e.g., the cell radio network temporary identifier (C-RNTI), which the mobile wireless device 102 received from the eNodeB 310 when originally establishing the RRC connection between the mobile wireless device 102 and the eNodeB 310 of the LTE wireless network 300. The C-RNTI can be contained in the layer 3 message as a medium access control (MAC) control element (CE). The eNodeB 310 can respond to the layer 3 message by providing UL grants to the mobile wireless device 102 on which to transmit data to the eNodeB 310. The UL grants can include the C-RNTI. If the RRC connection between the eNodeB 310 and the mobile wireless device 102 has been released, the eNodeB 310 may not respond to the preamble and/or the layer 3 message from the mobile wireless device 102.

Figure 11:
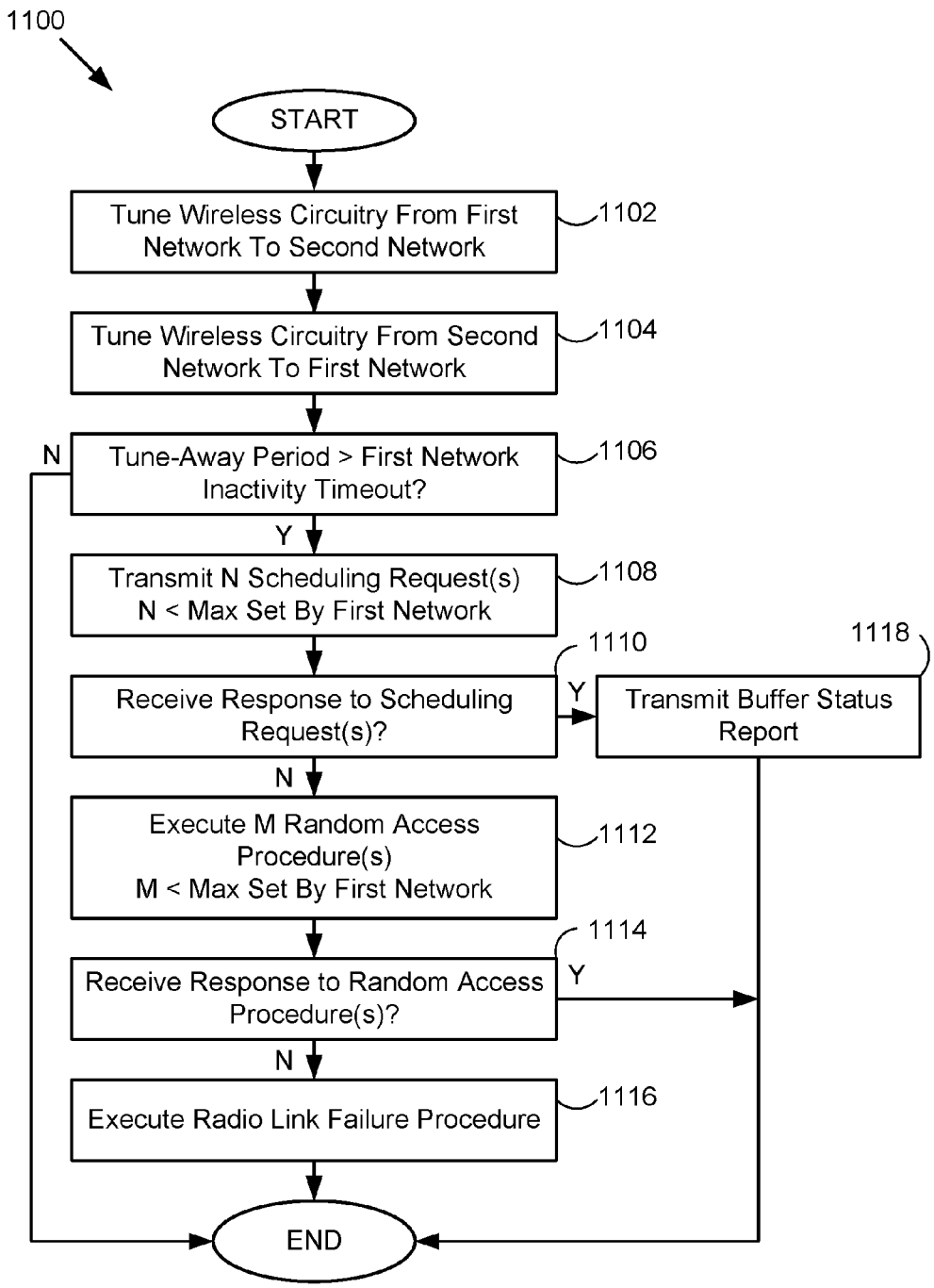
FIG. 11 illustrates a representative method for determining a connection state for an RRC connection between a mobile wireless device and a wireless access network in accordance with some embodiments.

FIG. 11 illustrates a representative method 1100 for determining a connection state for an RRC connection between a mobile wireless device and a wireless access network in accordance with some embodiments. In step 1102, the mobile wireless device 102 tunes wireless circuitry contained therein from a first wireless network (e.g., the LTE wireless network 300) to a second wireless network (e.g., the CDMA 2000 1× wireless network 200). After a tune-away time period, in step 1104, the mobile wireless device 102 tunes the wireless circuitry back from the second wireless network to the first wireless network. In some embodiments, the tune-away time period exceeds a time period for an inactivity timer to expire at an access network element (e.g., eNodeB 310) of the first wireless network (e.g., LTE wireless network 300). In step 1106, the mobile wireless device 102 determines whether the tune-away time period exceeds a first network inactivity timeout time period. In some embodiments, the mobile wireless device 102 obtains from the first wireless network. In some embodiments, the mobile wireless device 102 measures the tune-away time period as a time period during which the wireless circuitry in the mobile wireless device 102 is configured for communication with the second wireless network and not configured for communication with the first wireless network. When the tune-away time period does not exceed the first network inactivity timeout time period, the method 1000 ends. When the tune-away time period does exceed the first network inactivity timeout time period, the mobile wireless device 102 determines a connection state for a radio resource control (RRC) connection between the mobile wireless device 102 and the first wireless network. In step 1106, the mobile wireless device 102 transmits at most N scheduling request messages to the first wireless network. In an embodiment, the number N of scheduling request messages transmitted is less than a maximum number of scheduling request repeat transmissions established by the first wireless network with the mobile wireless device 102. In some embodiments, the first wireless network communicates the maximum number of scheduling request repeat messages during establishment of an RRC connection between the mobile wireless device 102 and an access network element of the first wireless network, e.g., eNodeB 310 of LTE wireless network 300. In an embodiment, N=1. In step 1110, the mobile wireless device determines whether a response is received from the first wireless network in response to at least one of the transmitted scheduling request messages. When a positive response is received from the first wireless network, the mobile wireless device 102, in step 1118, transmits a buffer status report (BSR) message to the first wireless network. In an embodiment, the buffer status report message includes an indication of an empty uplink transmit buffer in the mobile wireless device 102. The mobile wireless device 102 can transmit the SR messages upon returning from the tune-away time period, even when there is no uplink data to transmit to the first wireless network. When the mobile wireless device 102 determines that no response is received to the SR request messages from the first wireless network, the mobile wireless device 102 initiates one or more random access procedures. In step 1112, the mobile wireless device 102 executes at most M random access procedures with the first wireless network, where M is less than a maximum number of random access procedure preamble transmissions configured by the first wireless network. In an embodiment, M=1. In some embodiments, the random access procedure includes transmitting a preamble sequence. In some embodiments, the random access procedure includes transmitting a message including an identifier uniquely associated with an RRC connection between the mobile wireless device 102 and the first wireless network. In step 1114, the mobile wireless device 102 determines whether a positive response to at least one of the random access procedures is received from the first wireless network. When the mobile wireless device 102 receives a positive response to a random access procedure, the method 1100 ends. When the mobile wireless device 102 does not receive a response to the random access procedures, in step 116 the mobile wireless device executes a radio link failure procedure. In some embodiments, the radio link failure procedure includes transitioning an internal state of the mobile wireless device 102 from an RRC connected state to an RRC idle state. In some embodiments, the radio link failure procedure includes establishing a new RRC connection between the mobile wireless device 102 and the first wireless network. In some embodiments, the radio link failure procedure includes re-establishing an existing RRC connection between the mobile wireless device 102 and the first wireless network. In some embodiments, re-establishing the existing RRC connection includes (1) sending an RRC re-establishment request message to the first wireless network, (2) receiving an RRC connection re-establishment message from the first wireless network, and (3) sending an RRC connection re-establishment complete message to the first wireless network.

Figure 12:
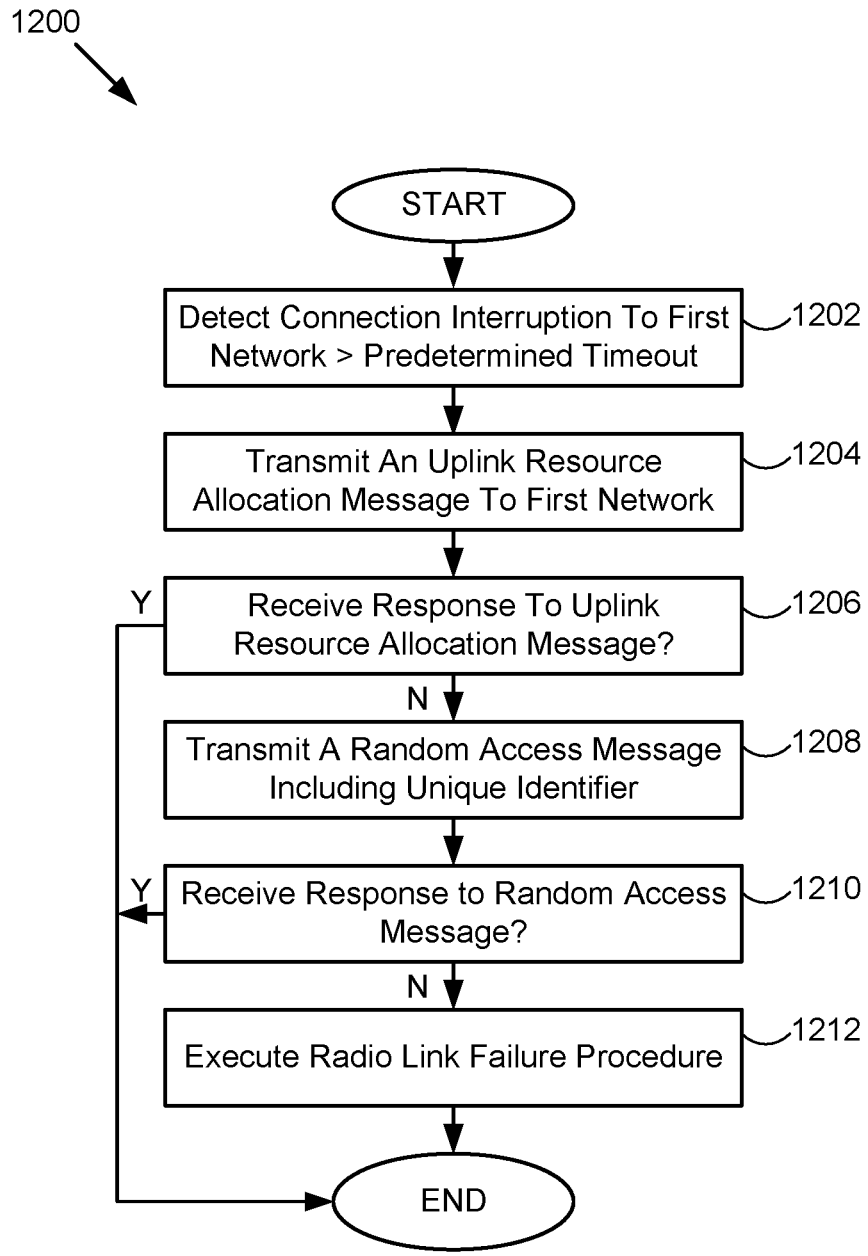
FIG. 12 illustrates another representative method for determining a connection state for an RRC connection between a mobile wireless device and a wireless access network in accordance with some embodiments.

FIG. 12 illustrates another representative method for determining a connection state for an RRC connection between a mobile wireless device 102 and a wireless access network in accordance with some embodiments. In step 1202, the mobile wireless device 102 detects an interruption of a connection between the mobile wireless device 102 and a first wireless network that exceeds a pre-determined timeout value. In some embodiments, the mobile wireless device 102 configures wireless circuitry in the mobile wireless device 102 to transmit and/or receive radio frequency signals to and/or from the first wireless network to a second wireless network and subsequently configures the wireless circuitry back to the first wireless network. In some embodiments, the time period during which the wireless circuitry is configured to the second wireless network exceeds the predetermined timeout period, e.g., an inactivity timeout period or a "lack of response" timeout period for the first wireless network. In some embodiments, the mobile wireless device 102 does not receive a connection release message (e.g., a radio resource control connection release message) from the first wireless network while the wireless circuitry is configured to the second wireless network. Upon returning to the first wireless network after an extended time period on the second wireless network, the mobile wireless device 102 can transmit one or more different messages to the first wireless network to determine a connection state between the mobile wireless device 102 and the first wireless network. In some embodiments, the mobile wireless device 102 probes the first wireless network to determine whether a previous RRC connection is active, i.e. the mobile wireless device 102 is "connected" to the first wireless network. In step 1204, the mobile wireless device 102 transmits an uplink resource allocation message requesting radio resources for uplink data transmission to the first wireless network. In some embodiments, the mobile wireless device 102 transmits the uplink resource allocation message irrespective of a state of uplink transmit buffers in the mobile wireless device 102, e.g., the uplink transmit buffers can be empty or can contain pending uplink data. When the mobile wireless device 102 receives a positive response to the uplink resource allocation message from the first wireless network in step 1206, the method ends. When the mobile wireless device 102 does not receive a positive response to the uplink resource allocation message from the first wireless network, the mobile wireless device 102 can transmit a random access message to the first wireless network. In some embodiments, the random access message includes a unique identifier by which the first wireless network can identify the mobile wireless device 102. In some embodiments, the unique identifier is associated with an existing or previous RRC connection between the mobile wireless device 102 and a network access element of the first wireless network. When the mobile wireless device 102 receives a positive response from the first wireless network to the random access message in step 1210, the method ends. When the mobile wireless device 102 does not receive a positive response from the first wireless network to the random access message, the mobile wireless device 102 can execute a radio link failure procedure in step 1212. In some embodiments, the mobile wireless device 102 attempts to re-establish a previous radio resource control connection with the first wireless network. In some embodiments, the mobile wireless device 102 attempts to establish a new radio resource control connection with the first wireless network. In some embodiments, upon receiving a positive response from the first wireless network to the uplink resource allocation message, the mobile wireless device 102 transmits a buffer status report that includes information about pending uplink data in transmit buffers of the mobile wireless device 102 to the first wireless network. In some embodiments, the mobile wireless device 102 transmits a maximum of N=1 uplink resource allocation messages to the first wireless network in step 1204. In some embodiments, the mobile wireless device 102 transmits N>2 uplink resource allocation messages to the first wireless network in step 1204, where N is less than a maximum number of repetitions for uplink resource allocation requests configured by the first wireless network. In some embodiments, the mobile wireless device 102 transmits the random access message as part of a random access procedure. In some embodiments, the mobile wireless device 102 transmits one or more preamble messages as part of the random access procedure to the first wireless network. In some embodiments, the mobile wireless device 102 transmits a number of preamble messages in step 1210 that is less than a maximum number of preamble repetitions configured by the first wireless network.

Software, hardware, or a combination of hardware and software can implement various aspects of the described embodiments. The described embodiments can also be encoded as computer program code on a non-transitory computer readable medium. The non-transitory computer readable medium is any data storage device that can store data that can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method comprising:
by a mobile wireless device:
transmitting at least one uplink resource allocation message to a wireless network in response to detecting an interruption of a connection with the wireless network, the interruption exceeding an inactivity threshold;
when receiving no response from the wireless network to the at least one uplink resource allocation message, transmitting at least one random access message to the wireless network; and
when receiving no response from the wireless network to the at least one random access message, executing a radio link failure procedure.

2. The method of claim 1, wherein the interruption of the connection with the wireless network comprises a tune-away event for the mobile wireless device to communicate with another wireless network.

3. The method of claim 1, wherein the at least one uplink resource allocation message comprises at least one scheduling request (SR) message.

4. The method of claim 1, wherein the mobile wireless device detects the interruption of the connection with the wireless network by at least measuring a time period during which the mobile wireless device is not configured to communicate with the wireless network.

5. The method of claim 1, further comprising:
by the mobile wireless device:
when receiving a positive response from the wireless network to the uplink resource allocation message, transmitting a buffer status report to the wireless network.

6. The method of claim 1, wherein the wireless network provides a value for the inactivity threshold.

7. The method of claim 1, wherein the at least one random access message comprises a preamble and a unique identifier that corresponds to a radio resource control (RRC) connection between the mobile wireless device and the wireless network.

8. The method of claim 7, wherein the unique identifier comprises a cell radio network temporary identifier (C-RNTI).

9. A mobile wireless device comprising:
one or more processors;
wireless circuitry, comprising one or more antennas, communicatively coupled to the one or more processors; and
memory communicatively coupled to the one or more processors and storing instructions that, when executed by the one or more processors, cause the mobile wireless device to:
transmit at least one uplink resource allocation message to a wireless network in response to detecting an interruption of a connection with the wireless network, the interruption exceeding an inactivity threshold;
when receiving no response from the wireless network to the at least one uplink resource allocation message, transmit at least one random access message to the wireless network; and
when receiving no response from the wireless network to the at least one random access message, execute a radio link failure procedure.

10. The mobile wireless device of claim 9, wherein the interruption of the connection with the wireless network comprises a tune-away event for the mobile wireless device to communicate with another wireless network.

11. The mobile wireless device of claim 9, wherein the least one resource allocation message comprises at least one scheduling request (SR) message.

12. The mobile wireless device of claim 9, wherein the mobile wireless device detects the interruption of the connection with the wireless network by at least measuring a time period during which the mobile wireless device is not configured to communicate with the wireless network.

13. The mobile wireless device of claim 9, wherein the at least one random access message comprises a preamble and a unique identifier that corresponds to a radio resource control (RRC) connection between the mobile wireless device and the wireless network.

14. The mobile wireless device of claim 13, wherein the unique identifier comprises a cell radio network temporary identifier (C-RNTI).

15. An apparatus configurable for operation in a mobile wireless device, the apparatus comprising:
one or more processors; and
memory communicatively coupled to the one or more processors and storing instructions that, when executed by the one or more processors, cause the mobile wireless device to:
transmit at least one uplink resource allocation message to a wireless network in response to detecting an interruption of a connection with the wireless network, the interruption exceeding an inactivity threshold;
when receiving no response from the wireless network to the at least one uplink resource allocation message, transmit at least one random access message to the wireless network; and
when receiving no response from the wireless network to the at least one random access message, execute a radio link failure procedure.

16. The apparatus of claim 15, wherein the interruption of the connection with the wireless network comprises a tune-away event for the mobile wireless device to communicate with another wireless network.

17. The apparatus of claim 15, wherein the least one resource allocation message comprises at least one scheduling request (SR) message.

18. The apparatus of claim 15, wherein execution of the instructions by the one or more processors further cause the mobile wireless device to:
   detect the interruption of the connection with the wireless network by at least measuring a time period during which the mobile wireless device is not configured to communicate with the wireless network.

19. The apparatus of claim 15, wherein the at least one random access message comprises a preamble and a unique identifier that corresponds to a radio resource control (RRC) connection between the mobile wireless device and the wireless network.

20. The apparatus of claim 19, wherein the unique identifier comprises a cell radio network temporary identifier (C-RNTI).

* * * * *

UNITED STATES PATENT AND TRADEMARK OFFICE
CERTIFICATE OF CORRECTION

PATENT NO. : 9,560,538 B2
APPLICATION NO. : 15/174623
DATED : January 31, 2017
INVENTOR(S) : Li Su et al.

Page 1 of 1

It is certified that error appears in the above-identified patent and that said Letters Patent is hereby corrected as shown below:

In the Specification

Column 17, Line 12: "step 116" should read -- step 1116 --.

Signed and Sealed this
Seventh Day of March, 2017

Michelle K. Lee
*Director of the United States Patent and Trademark Office*